Dec. 20, 1927.
C. C. FARMER
1,653,161
FLUID PRESSURE CHARGING DEVICE
Filed Nov. 20, 1926
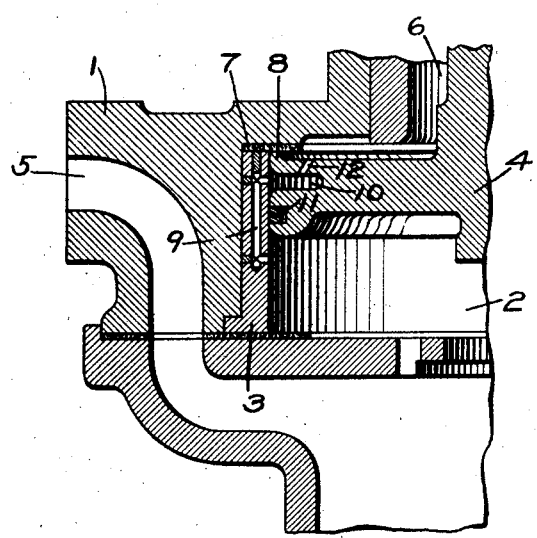
INVENTOR
CLYDE.C.FARMER
BY *Wm. N. Cady*
ATTORNEY Patented Dec. 20, 1927.

1,653,161

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE-CHARGING DEVICE.

Application filed November 20, 1926. Serial No. 149,672.

This invention relates to fluid pressure charging devices and more particularly to means for controlling the flow of fluid under pressure past a piston.

It is the usual practice to control the flow of fluid under pressure from one side of a piston to the opposite side by providing a groove in the piston cylinder, which groove extends slightly beyond the opposite sides of the piston. Either in the case of a piston fitted with a piston packing ring or when a piston without a packing ring is employed and the piston has a lap fit in the cylinder, there is liable to be a certain degree of leakage of fluid under pressure from one side of the piston to the other side, which leakage increases as wear of the operating parts takes place, and in addition, in the case of a piston having a packing ring, as the opening between the ends of the ring increases, on account of wear, the leakage is increased by flow between the ends of the packing ring.

The principal object of my invention is to provide means for more accurately controlling the flow of fluid under pressure from one side of a piston to the opposite side, regardless of leakage past the piston.

In the accompanying drawing, the single figure is a sectional view of a portion of a piston and piston cylinder, showing my invention applied thereto.

In the drawing, the reference numeral 1 indicates a casing having a piston chamber 2 provided with a bushing 3 and containing a piston 4, fluid under pressure being supplied through passage 5 to chamber 2. The chamber 6 at the opposite side of piston 4 may be connected to a reservoir and is adapted to be charged with fluid under pressure from chamber 2.

A gasket 7 is clamped in position by the bushing 3 and provides a seat for the seat ring 8 of the piston 4. A port 9 extends longitudinally in the bushing 3 and is provided with transverse ports at its opposite ends which open into the piston chamber 2. The piston 4 is provided with an annular groove 10 disposed between the piston packing ring 11 and the seat ring 8 and when the seat ring 8 engages the gasket 7, one of the transverse ports opens into the groove 10, while the other opens into piston chamber 2, at the outer face of the piston 4. A flow control port 12 connects annular groove 10 with the chamber 6.

In operation, when fluid under pressure is supplied through passage 5 to chamber 2, the piston 4 is shifted so that the seat ring 8 of said piston seals against the gasket 7. Fluid under pressure in chamber 2 then flows through port 9 into the annular groove 10 of the piston 4 and through port 12 to chamber 6, charging said chamber with fluid under pressure.

The piston seat ring 8 sealing against the gasket 7, prevents flow of fluid from the annular groove 10 to the chamber 6, except by flow through the port 12.

In case the piston packing ring 11 leaks so that fluid under pressure is admitted to the annular groove 10 in the piston 4 by ring leakage, in addition to the flow through port 9, there will be no increased flow of fluid from the piston chamber 2 to chamber 6, since the rate of flow is limited by the size of the port 12, so that the leakage will not effect the charging rate of the chamber 6.

It is not essential that the particular arrangement of ports in the bushing 3, as shown, be employed, since the usual type of feed groove may be employed, the groove being adapted, in the seated position of seat ring 8, to connect chamber 2 with the annular groove 10 in the piston 4, so that the feed groove would serve the same function as the port 9. However, the port arrangement shown is considered preferable.

When the pressure in chamber 2 is decreased, the higher pressure in chamber 6 will shift the piston 4 outwardly, so that the seat ring 8 is moved away from the gasket 7. With the piston 4 in its outer position, communication from chamber 2 through port 9 to chamber 6 is cut off.

Having now described my invention, what I claim as new and desire to secure by Letters Patent, is:—

1. The combination with a piston cylinder, of a piston in said cylinder having an annular groove and a port of predetermined flow area connecting said groove with the chamber at one side of the piston, said cylinder being provided with a passageway connecting the chamber at the opposite side of said piston with said groove.

2. The combination with a piston cylinder, of a piston in said cylinder adapted to seat and prevent flow from the chamber at one side of the piston to the chamber at the other side of the piston, said piston having an annular groove and a port of predetermined flow area connecting said groove with the chamber at one side of the piston, said cylinder being provided with a passageway connecting the chamber at the opposite side of the piston with said groove.

3. The combination with a piston cylinder, of a piston in said cylinder having a piston packing ring and an annular groove having a port connecting said groove with the chamber at one side of said piston, said cylinder being provided with a passageway connecting the chamber at the opposite side of said piston with said groove and around said packing ring.

4. The combination with a piston cylinder, of a piston in said cylinder adapted to seat and prevent flow from the chamber at one side of said piston to the chamber at the opposite side of said piston, said piston having a piston packing ring and an annular groove having a port connecting said groove with the chamber at one side of said piston, said cylinder having a passageway connecting the chamber at the opposite side of said piston with said groove and around said packing ring.

5. The combination with a piston cylinder, of a piston in said cylinder having a seated position, communication in the seated position from the chamber at one side of said piston to the chamber at the opposite side of said piston being only by way of a passageway in the cylinder leading from the chamber at one side of the piston to an annular groove in said piston and from said groove through a port of predetermined area to the chamber at the opposite side of said piston.

In testimony whereof I have hereunto set my hand.

CLYDE C. FARMER.